US012783738B2

(12) United States Patent
Elfadel et al.

(10) Patent No.: US 12,783,738 B2
(45) Date of Patent: Nov. 3, 2026

(54) STATE PERMUTATION LOGIC LOCKING (SPeLL) FOR SEQUENTIAL CIRCUITS

(71) Applicant: Technology Innovation Institute—Sole Proprietorship LLC, Masdar City (AE)

(72) Inventors: Ibrahim M. Elfadel, Abu Dhabi (AE); Shahzad Muzaffar, Eindhoven (NL); Kashif Nawaz, Abu Dhabi (AE)

(73) Assignee: Technology Innovation Institute—Sole Proprietorship LLC, Abu Dhabi (AE)

( * ) Notice: Subject to any disclaimer, the term of this patent is extended or adjusted under 35 U.S.C. 154(b) by 130 days.

(21) Appl. No.: 18/479,905

(22) Filed: Oct. 3, 2023

(65) Prior Publication Data

US 2024/0119183 A1 Apr. 11, 2024

Related U.S. Application Data

(60) Provisional application No. 63/378,104, filed on Oct. 3, 2022.

(51) Int. Cl.
*G06F 21/72* (2013.01)

(52) U.S. Cl.
CPC .................................. *G06F 21/72* (2013.01)

(58) Field of Classification Search
CPC ......... G06F 21/72; G06F 21/76; G06F 9/4498
USPC ................................ 713/189, 193; 380/260
See application file for complete search history.

(56) References Cited

U.S. PATENT DOCUMENTS

| | | | | |
|---|---|---|---|---|
| 8,402,401 | B2 * | 3/2013 | Chakraborty | G09C 1/00 713/193 |
| 11,657,127 | B2 * | 5/2023 | Bhunia | G06F 21/602 713/189 |
| 12,182,315 | B1 * | 12/2024 | Katkoori | G06F 21/72 |
| 12,316,742 | B2 * | 5/2025 | Bilgin | H04L 9/0861 |
| 12,380,250 | B2 * | 8/2025 | Blanton | H04L 9/14 |
| 2011/0148457 | A1 * | 6/2011 | Abramovici | G06F 21/14 326/8 |
| 2020/0053079 | A1 * | 2/2020 | Bendersky | H04L 9/14 |

(Continued)

OTHER PUBLICATIONS

Slusarczyk, A. S., Decomposition and encoding of finite state machines for FPGA implementation. [Phd Thesis 1 (Research TU/e /Graduation TU/e), Electrical Engineering]. Technische Universiteit Eindhoven. https://doi.org/10.6100/IR5825912004, (2004). (Year: 2004).*

(Continued)

*Primary Examiner* — Lizbeth Torres-Diaz
(74) *Attorney, Agent, or Firm* — DLA Piper LLP (US)

(57) ABSTRACT

A method of state permutation logic locking (SPeLL) for sequential circuits. The method includes encrypting original states of a sequential circuit to produce encrypted states, by transitioning an initial order of the original states into a secret permutation of the encrypted states, where the secret permutation is different than the initial order. The method also includes determining a cryptographic key that corresponds to the transition from the initial order of the original states to the secret permutation of the encrypted states, and decrypting the encrypted states, by using the cryptographic key to transition from the secret permutation of the encrypted states back to the initial order of the original states.

20 Claims, 15 Drawing Sheets

(56) References Cited

U.S. PATENT DOCUMENTS

| | | | | |
|---|---|---|---|---|
| 2021/0192018 A1* | 6/2021 | Bhunia | .................. | G06F 21/76 |
| 2022/0284132 A1* | 9/2022 | Blanton | .................. | G06F 21/75 |

OTHER PUBLICATIONS

Office Action Summary of AE Application No. P6002534/2023, dated Dec. 27, 2024, 10 pages.

International Search Report and Written Opinion for Application No. PCT/IB2023/059911, mailed on Nov. 30, 2023, 12 Pages.

Patooghy, et al., "Mystic: Mystifying IP cores using an always-ON FSM obfuscation method," 2018 IEEE Computer Society Annual Symposium on VLSI (ISVLSI), 2018, pp. 626-631.

Juretus, et al., "Synthesis of hidden state transitions for sequential logic locking," IEEE Transactions on Computer-Aided Design of Integrated Circuits and Systems 40.1, 2020, pp. 11-23.

Li, et al., "JANUS: Boosting logic obfuscation scope through reconfigurable FSM synthesis," 2021 IEEE International Symposium on Hardware Oriented Security and Trust (HOST), 2021, 12 pages.

Kamali, et al., "SCRAMBLE: The state, connectivity and routing augmentation model for building logic encryption," 2020 IEEE Computer Society Annual Symposium on VLSI (ISVLSI), 2020, 7 pages.

Guo, et al., "Permutation-Based Obfuscation," Hardware Protection through Obfuscation, 2017, pp. 103-133.

Meade, et al., "Revisit sequential logic obfuscation: Attacks and defenses," 2017 IEEE International Symposium on Circuits and Systems (ISCAS), 2017, 4 pages.

Office Action and Search Report for United Arab Emirates Patent Application No. P6002534/2023, dated Sep. 23, 2024, 10 pages.

* cited by examiner

300

400

| State # | FKIP | PKIP | | | | | |
|---|---|---|---|---|---|---|---|
| | | $Col_0$ | $Col_1$ | $Col2_2$ | $Col_{0\&2}$ | ZigZag | Triangular |
| 0 | $k_{16}k_8k_0$ | $00k_0$ | $0k_00$ | $k_000$ | $k_80k_0$ | $00k_0$ | $00k_0$ |
| 1 | $k_{17}k_9k_1$ | $00k_1$ | $0k_11$ | $k_101$ | $k_90k_1$ | $0k_11$ | $0k_11$ |
| 2 | $k_{18}k_{10}k_2$ | $01k_2$ | $0k_20$ | $k_210$ | $k_{10}0k_2$ | $k_210$ | $k_210$ |
| 3 | $k_{19}k_{11}k_3$ | $01k_3$ | $0k_31$ | $k_311$ | $k_{11}0k_3$ | $0k_31$ | $01k_3$ |
| 4 | $k_{20}k_{12}k_4$ | $10k_4$ | $1k_40$ | $k_400$ | $k_{12}0k_4$ | $10k_4$ | $1k_40$ |
| 5 | $k_{21}k_{13}k_5$ | $10k_5$ | $1k_51$ | $k_501$ | $k_{13}0k_5$ | $1k_51$ | $k_501$ |
| 6 | $k_{22}k_{14}k_6$ | $11k_6$ | $1k_60$ | $k_610$ | $k_{14}0k_6$ | $k_610$ | $11k_6$ |
| 7 | $k_{23}k_{15}k_7$ | $11k_7$ | $1k_71$ | $k_711$ | $k_{15}0k_7$ | $1k_71$ | $1k_71$ |

FIG. 4

500

| State Label | Binary | | |
| --- | --- | --- | --- |
| | $Col_2$ | $Col_1$ | $Col_0$ |
| 4 | 1 | 0 | 0 |
| 0 | 0 | 0 | 0 |
| 2 | 0 | 1 | 0 |
| 7 | 1 | 1 | 1 |
| 3 | 0 | 1 | 1 |
| 6 | 1 | 1 | 0 |
| 1 | 0 | 0 | 1 |
| 5 | 1 | 0 | 1 |

FIG. 5

800

| Inputs | | | | SSPs ($\psi$ - $\gamma$ - $f$) | | |
|---|---|---|---|---|---|---|
| w | x | y | z | $n_{vs} = 4$ | $n_{vs} = 3$ | $n_{vs} = 2$ |
| 0 | 0 | 0 | 0 | 24 - 24 - 1 | 24 - 24 - 1 | 72 - 12 - 6 |
| 1 | 0 | 0 | 0 | - | 48 - 24 - 2 | 60 - 12 - 5 |
| 0 | 1 | 0 | 0 | - | 72 - 24 - 3 | 48 - 12 - 4 |
| 1 | 1 | 0 | 0 | - | 72 - 24 - 3 | 48 - 12 - 4 |
| 0 | 0 | 1 | 0 | - | 96 - 24 - 4 | 48 - 12 - 4 |
| 1 | 0 | 1 | 0 | - | - | 144 - 12 - 12 |
| 0 | 1 | 1 | 0 | - | 96 - 24 - 4 | 48 - 12 - 4 |
| 1 | 1 | 1 | 0 | - | 24 - 24 - 1 | 156 - 12 - 13 |
| 0 | 0 | 0 | 1 | - | 48 - 24 - 2 | 72 - 12 - 6 |
| 1 | 0 | 0 | 1 | - | 48 - 24 - 2 | 60 - 12 - 5 |
| 0 | 1 | 0 | 1 | - | - | 120 - 12 - 10 |
| 1 | 1 | 0 | 1 | - | 24 - 24 - 1 | 96 - 12 - 8 |
| 0 | 0 | 1 | 1 | - | 96 - 24 - 4 | 48 - 12 - 4 |
| 1 | 0 | 1 | 1 | - | - | 144 - 12 - 12 |
| 0 | 1 | 1 | 1 | - | 24 - 24 - 1 | 120 - 12 - 10 |
| 1 | 1 | 1 | 1 | - | - | 180 - 12 - 15 |

FIG. 8

900

| | [12] | [13] | [14] | [15] | [16] | SPeLL |
|---|---|---|---|---|---|---|
| Key Provision | Sequence[a] | Sequence | Sequence | Sequence | Sequence | Fixed Large Key |
| Extra/Dummy/Black-Hole States | Yes | Yes | Yes | Yes | Yes | No |
| Unique State Permutations (Using FF count in ISCAS89 Circuits) | $< 30$ | $< 30$ | $< 260$ | $< 30$ | $< 30$ | $182 - 2\times10^{6}$(min) $87\times10^{9} - 27\times10^{3879}$(max) |
| Never Exit Obfuscation Mode | No | No | Yes | Yes | Yes | No |
| Security Insertion Level | Gate Level | Gate Level | Gate Level | Gate Level | Gate Level | Behavioral Level |
| Protection Span | Temporary[b] | Temporary | Temporary | Temporary | Temporary | Permanent[c] |
| Prone to Register Overwrite Attacks | Yes | Yes | Yes | Yes | Yes | No |
| Prone to Frequency Attacks | Yes | Yes | Yes | Yes | Yes | No |
| Prone to Side-Channel Attacks | Yes | Yes | Yes | Yes | Yes | No |
| Ease of Adding Security | Medium[d] | Medium | Medium | Medium | Medium | Easy[e] |

FIG. 9

1100

| Counter Size | S-I-O-T[a] | | OD[b] | FKIP | PKIP ($Col_y$) | | | | |
|---|---|---|---|---|---|---|---|---|---|
| | | | | | 3 | 2 | 1 | 0 | $n_s$ & $n_s$-1 |
| 4 | 4-0-2-4 | FSPs | - | 24 | - | - | 4 | | 24 |
| | | LBs[c] | 1 | 6 | - | - | 5 | | 6 |
| 8 | 8-0-3-8 | FSPs | - | 40320 | - | 16 | | | 576 |
| | | LBs | 2 | 18 | - | 9 | | | 16 |
| 16 | 16-0-4-16 | FSPs | - | $>10^{13}$ | 256 | | | | $>10^5$ |
| | | LBs | 2 | 104 | 22 | | | | 45 |

FIG. 11

1200

| Circuit Name | S-I-O-T[a] | OD[b] (LBs) | LD[c] (FKIP) (LBs) | LD[c] (FKIP) %↑[d] | LD (PKIP) (LBs) | LD (PKIP) %↑ |
|---|---|---|---|---|---|---|
| train4 | 4-2-1-14 | 6 | 10 | 66 | 134 | 2133 |
| dk15 | 4-3-5-32 | 10 | 19 | 90 | 17 | 70 |
| beecount | 7-3-4-28 | 35 | 47 | 34 | 57 | 63 |
| dk14 | 7-3-5-56 | 23 | 38 | 65 | 63 | 174 |
| dk17 | 8-2-3-32 | 14 | 35 | 150 | 60 | 328 |
| ex6 | 8-5-8-34 | 36 | 64 | 77 | 85 | 136 |
| cse | 16-7-7-91 | 71 | 163 | 129 | 145 | 104 |
| kirkman | 16-12-6-370 | 87 | 160 | 84 | 100 | 15 |
| sand | 32-11-9-184 | 215 | 332 | 54 | 242 | 12 |
| s298 | 218-3-6-1096 | 1098 | 2592 | 136 | 1270 | 15 |

FIG. 12

STATE PERMUTATION LOGIC LOCKING (SPeLL) FOR SEQUENTIAL CIRCUITS

CROSS-REFERENCE TO RELATED APPLICATION

This application claims priority to U.S. Provisional Application No. 63/378,104, filed Oct. 3, 2022, which is incorporated by reference in its entirety.

FIELD

The present disclosure relates to state permutation logic locking (SPeLL) for sequential circuits.

BACKGROUND

Hardware security has been actively researched due to the explosive growth of fabless design houses in the semiconductor industry. With chip fabrication outsourced to independent foundries, the protection of design intellectual property against tampering, piracy, and overprinting became of importance to intellectual property owners and trusted foundries. Since then, methods for hardware protection have constantly evolved. Among the most popular measures, logic locking and obfuscation have progressively featured more sophisticated techniques for protection against such threats as overproduction, reverse engineering, and counterfeit. However, the major focus of these techniques has been to secure the combinational logic of the design using common key encryption. The desired operation of the design is unlocked when the correct key is applied. Otherwise, incorrect logic outputs are generated. Attacks on logic locking for combinational circuits have focused on attempting to determine the correct key.

SUMMARY

A method/system for State Permutation Logic Locking (SPeLL), for securing sequential circuits at the Register-Transfer Level (RTL) that does not require any state augmentation. The algorithm is based on the encryption of the state encodings with a key. When the correct key is input at runtime, the sequential circuit operates as designed, otherwise the sequential circuit operates according to a state transition map that is defined by the wrong key.

In one aspect, the present disclosure relates to a method of state permutation logic locking (SPeLL) for sequential circuits. The method comprising encrypting original states of a sequential circuit to produce encrypted states, by transitioning an initial order of the original states into a secret permutation of the encrypted states, where the secret permutation is different than the initial order, determining a cryptographic key that corresponds to the transition from the initial order of the original states to the secret permutation of the encrypted states, and decrypting the encrypted states, by using the cryptographic key to transition from the secret permutation of the encrypted states back to the initial order of the original states.

In embodiments of this aspect, the disclosed method comprises defining the encrypting of the original states of the sequential circuit at a Register-Transfer Level (RTL).

In embodiments of this aspect, the disclosed method comprises encrypting the original states of the sequential circuit to produce the secret permutation of the encrypted states having a number of encrypted states equal to a number of the original states.

In embodiments of this aspect, the disclosed method comprises encrypting all of the original states to produce the encrypted states.

In embodiments of this aspect, the disclosed method comprises encrypting a subset of the original states to produce the encrypted states.

In embodiments of this aspect, the disclosed method comprises encrypting the original states of the sequential circuit by encrypting selected bits representing the original states.

In embodiments of this aspect, the disclosed method comprises determining the cryptographic key by receiving the cryptographic key from an external device external to the sequential circuit.

In embodiments of this aspect, the external device is a tamper-proof key provider residing in an embedded system with the sequential circuit.

In embodiments of this aspect, the external device is communicatively coupled to an embedded system in which the sequential circuit resides.

In embodiments of this aspect, the sequential circuit resides on an application specific integrated circuit (ASIC), a field programmable gate array (FPGA), or a programmable logic controller (PLC).

In one aspect, the present disclosure relates to a sequential circuit protected by state permutation logic locking (SPeLL), the sequential circuit comprising: an encryption circuit configured to encrypt original states of the sequential circuit to produce encrypted states, by transitioning an initial order of the original states into a secret permutation of the encrypted states, wherein the secret permutation is different than the initial order; a reception circuit configured to receive a cryptographic key that corresponds to the transition from the initial order of the original states to the secret permutation of the encrypted states; and a decryption circuit configured to decrypt the encrypted states by using the cryptographic key to transition from the secret permutation of the encrypted states back to the initial order of the original states.

In embodiments of this aspect, the encryption circuit is configured to define the encrypting of the original states of the sequential circuit at a Register-Transfer Level (RTL).

In embodiments of this aspect, the encryption circuit is configured to encrypt the original states of the sequential circuit to produce the secret permutation of the encrypted states having a number of encrypted states equal to a number of the original states.

In embodiments of this aspect, the encryption circuit is configured to encrypt all of the original states to produce the encrypted states.

In embodiments of this aspect, the encryption circuit is configured to encrypt a subset of the original states to produce the encrypted states.

In embodiments of this aspect, the encryption circuit is configured to encrypt the original states of the sequential circuit by encrypting selected bits representing the original states.

In embodiments of this aspect, the decryption circuit is configured to determine the cryptographic key by receiving the cryptographic key from an external device external to the sequential circuit.

In embodiments of this aspect, the external device is a tamper-proof key provider residing in an embedded system with the sequential circuit.

In embodiments of this aspect, the external device is communicatively coupled to an embedded system in which the sequential circuit resides.

In embodiments of this aspect, the sequential circuit resides on an application specific integrated circuit (ASIC), a field programmable gate array (FPGA), or a programmable logic controller (PLC).

BRIEF DESCRIPTION OF DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrated only typical embodiments of this disclosure and are therefore not to be considered limiting of its scope, for the disclosure may admit to other equally effective embodiments.

FIG. 4 is a table showing example key insertion patterns for 8 an state FSM, according to embodiments of the disclosure.

FIG. 5 is an encrypted state table for a selected FSP, according to embodiments of the disclosure.

FIG. 8 is a table showing locked FSM simulation results for a 4 state FSM, according to embodiments of the disclosure.

FIG. 9 is a table showing SPeLL comparison with state-of-the-art algorithms, according to embodiments of the disclosure.

FIG. 11 is a table showing hardware resources vs. FSP complexity, according to embodiments of the disclosure.

FIG. 12 is a table showing benchmark circuits synthesis results, according to embodiments of the disclosure.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
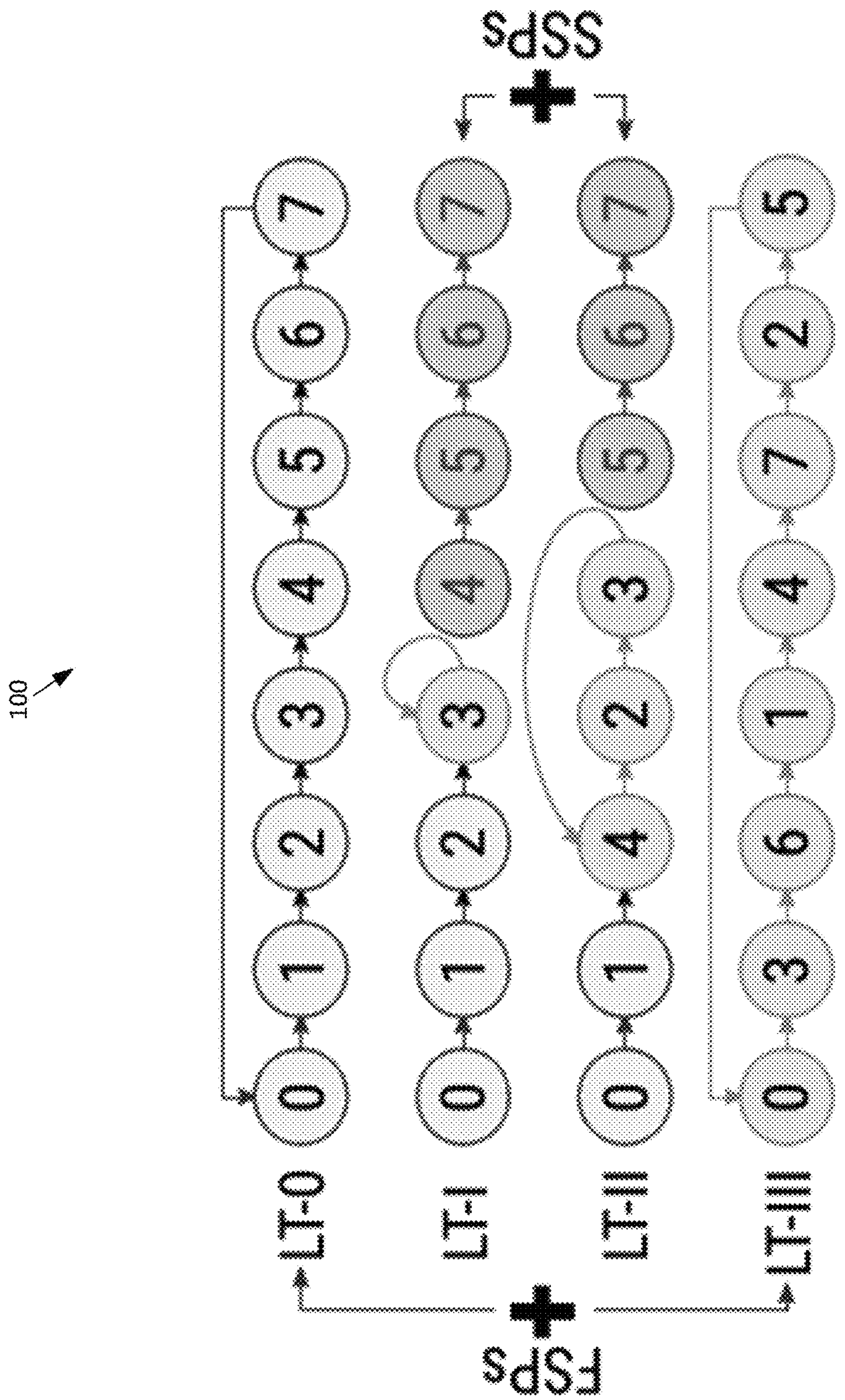
FIG. 1 is a diagram depicting finite-state-machine (FSM) lock Types, according to embodiments of the disclosure.

The disclosure relates to a method for executing an algorithm referred to herein as "State Permutation Logic Locking (SPeLL)", for securing sequential circuits at the Register-Transfer Level (RTL) through modifications of the hardware description language that does not require any state augmentation. The algorithm is based on the encryption of the state encodings with a key (i.e., cryptographic key) that is known to the IP provider. When the correct key is input to the sequential circuit at runtime, the sequential circuit operates as designed, otherwise the sequential circuit operates according to an incorrect state transition map that is defined by the incorrect key. More specifically, the key scrambles the encoded states of the state transition map into a random permutation that is difficult to determine due to the large number of possible state permutations. One advantage of the proposed method is that using the wrong key does not necessarily result in the sequential circuit getting stuck at any one state or getting trapped within any black hole. As a result, the secured sequential circuit is more immune to reverse engineering attacks, and is more immune to side-channel attacks due to the large number of wrong full-state transition maps. A full low-complexity, RTL design methodology based on SPeLL is disclosed herein with experiments quantifying the design overhead and illustrating advantages in terms of immunity to reverse engineering and side-channel attacks.

Sequential circuits have a wider exposure surface to attacks than combinational logic in that their power and timing patterns can be analyzed by a bad actor (e.g., attacker) to constrain the search space of the correct key. Consequently, even if the combinational portion of the design is secured, the sequential portion of the design can still provide a window for the bad actor to determine the correct key, thus compromising the hardware security of the entire design. Securing sequential circuits is therefore important for securing the entire design against attacks.

Logic locking for sequential circuits has received significantly less attention than that of logic locking for combinational circuits. In a sequential circuit, the transition graph of its finite-state machine (FSM) could be secured by having the FSM trapped into transitions between dummy states in case the correct key is not provided at runtime. Conventionally, a set of dummy states is added to the original FSM to support obfuscation modes of the transition graph while the normal mode of the design is executed if the correct key is used. Once the normal mode is entered, the protection is no longer active. Note that several sets of dummy states can be introduced, each dummy state set defining a trapping region (black hole) in the augmented state space of the FSM. The specific black hole within which the FSM will be trapped upon entering the wrong key depends on the current FSM state. These conventional techniques, however, are vulnerable to side-channel attacks as an attacker can identify and eliminate the ever-repeating dummy-state transitions by analyzing the power change patterns of the sequential circuit. These techniques are also vulnerable to register-overwrite attacks where the register values can be updated so as to entirely bypass the obfuscation modes. Finally, all of these conventional FSM obfuscation techniques are meant for implementation at the gate netlist level, and therefore special tools and in-depth knowledge of the gate netlist of the synthesized FSM are needed to insert logic locking into the design. For context, a gave-level netlist is circuit synthesized from a high-level description (e.g., Verilog HDL, etc.) of a designed circuit. The gave-level netlist includes the devices (e.g., flip-flops, gates, etc.) and interconnection between the devices representing how the designed circuit is to be implemented in the hardware fabric (e.g., FPGA, etc.). Conventional FSM obfuscation techniques, as described above, synthesize the design into the gate-level netlist and then make modifications to the design in the netlist. For example, conventional FSM obfuscation techniques may identify certain devices (e.g., flip-flops) in the netlist and make modifications to the hardware by modifying/adding additional sequential and/or combinational logic (e.g., adding additional flip-flops, modifying connections to existing flip-flops, etc.). This modified design is then realized in the hardware platform (e.g., FPGA, etc.).

The disclosed methods herein address the shortcomings of conventional FSM logic locking methods by introducing the following features:

1) Behavioral locking: The method integrates FSM logic locking into the design at the behavioral level rather than at the gate level. Specifically, the SPeLL solution modifies the design in the high-level hardware description language (e.g., Verilog HDL) rather than at the gate-level netlist. In other words, the modifications are made at the behavior level rather than adding/modifying specific hardware devices and interconnections. This significantly simplifies the FSM logic locking procedure.
2) Hardware overhead control: The method provides mechanisms for tuning the logic locking hardware overhead using different encryption modes and by giving library guidance to the logic synthesis step.
3) Obfuscating transitions: The method does not add dummy states to the design. The obfuscation is achieved at the level of the FSM transition graph by scrambling the state encodings to a random permutation. The wrong key therefore triggers wrong transitions amongst the existing FSM states. In other words, the behavioral code representing the FSM transition graph is modified by scrambling the states.
4) Maximizing confusion: The method ensures that all the state transition are equally likely and therefore provides protection against frequency-based and side-channel attacks.
5) Complicating reverse engineering: Since logic locking is introduced at the behavioral level, logic synthesis amalgamates normal and obfuscation modes, thus making the hardware less prone to attacks using reverse engineering. In other words, reverse-engineering is performed at the hardware level of the design. However, since the logic locking is introduced at the behavioral level (not at the netlist hardware level), determining the behavioral modifications from a hardware analysis is difficult.
6) Straightforward automation: The method can be automated by inserting a block of net assignments in the behavioral hardware description language (HDL) code of the design.

The basic idea of the proposed behavioral logic locking method is to encrypt the encodings of the FSM states so that the encrypted states are a permutation (e.g., random permutation) of the original FSM states (e.g., initial order of the states). For this reason, the proposed scheme is referred to as State Permutation Logic Locking (SPeLL). SPeLL converts the original static, next-state look-up table of the FSM into a key-dependent, dynamic look-up table. The in-order list of state labels is referred to as the state table. The first step in SPeLL may be the selection of a unique, secret permutation of the states in the next-state look-up table. The secret permutation defines the cryptographic key based on which the decryption procedure is triggered. The decryption process is the inverse permutation of the states in the look-up table. Since state encodings and state permutation can be selected according to a uniform probability distribution, the behavioral logic locking scheme is immune to frequency-based cryptanalysis. The proposed FSM logic locking method may be applied to a database of sequential circuits for providing permanent hardware protection of those sequential circuits. In addition to a precise quantitative assessment of the FSM logic locking overhead, experimental results highlight some of the engineering trade-offs that can be achieved between the strength of the locking and the design overhead. Several modes of locking are introduced to enable such trade-offs.

The behavioral FSM logic locking scheme, SPeLL, is described below with respect to lock types 100 shown in FIG. 1. Assume that the FSM has $n_s$ states. The description below explains the scheme on an FSM that is a serial counter having 8 states and no conditional next-state transitions as shown FIG. 1(LT-0). The description below also introduces conditional next-state transitions and describes how they are handled by SPeLL.

In an example, for describing an attack model and FSM lock types, the bad actor (i.e., attacker) is assumed to have physical access to the hardware (e.g., field programmable gate array (FPGA), application specific integrated circuit (ASIC)) and the synthesized bitstream file. The general encryption method may be known to the attacker but the design itself is unknown. The cryptographic key may be provided to the FSM chip either externally (from another key provider device) or through a tamper-proof key provider (e.g., tamper-proof on-chip memory). The correct state transitions are executed if the correct key is applied. Otherwise, the FSM is either stuck at a given state or follows a wrong state transition path between states. The state transition paths that result from applying a key to the FSM are referred to as Lock Types (LT). Lock types are categorized into four categories, as illustrated in FIG. 1:

1) LT-0 is a lock type associated with the transition path that results from applying the correct key. See FIG. 1(LT-0) where the counter correctly and repeatedly counts from 0 to 7.
2) LT-I is a lock type that results from applying the wrong key, whereby the FSM ends up being stuck in one of its states after a transient from some initial state. See FIG. 1(LT-I) where the counter is stuck at state 3.
3) LT-II is a lock type that results from applying the wrong key whereby the FSM ends up following a loop path made of a proper subset with at least two of the states after a transient from some initial state. See FIG. 1(LT-II) where the counter is stuck cycling between a subset of incorrectly ordered states 4, 2 and 3.
4) LT-III is a lock type that results from applying the wrong key whereby the FSM ends up following a loop path made of the full set of states. See FIG. 1(LT-II) where the counter is stuck cycling between the entire set of incorrectly ordered states 0, 3, 6, 1, 4, 7, 2 and 5.

Since a lock type LT-0 or LT-III involves the full set of states, it is referred to as Full-Set State Permutation (FSP). On the other hand, lock type LT-I or LT-II involves a subset of the FSM states, it is referred to as Sub-Set Permutations (SSP). Let V be a proper subset of visited sates in LT-I and LT-II, and let $n_{vs}$ be the cardinality of V. Then the SSP's can be further categorized according to $n_{vs}$ where notation $SSP_{nvs}$ can be used to denote a subset state permutation where $n_s$ is the number of visited states. Of course $FSP=SSP_{ns}$ It is noted that SSP count may be used for executing side-channel attacks. For example, as physical access to the FPGA is available, the attacker may use side-channel power pattern analysis to identify the correct key. If the key length is $n_k$, the number of power patterns that need to be recorded is $2^{nk}$. It is expected that FSM's with the same number of visited states, $n_{vs}$, will have the same or similar power consumption, $P_{nvs}$. The counting and sorting of all the recorded $P_{nvs}$ is expected to correlate each FSM with an SSP lock type, which may help the attacker minimize the set of possible corresponding keys. In other words, the attacker is left with a shorter list of the keys corresponding to the FSP lock type, one of which is the correct key.

With these types of attacks in mind, a beneficial aspect of SPeLL is to add a significant number of state permutations that correspond to the LT-III lock type where the number of visited states during locking is equal to the number of original states. Additionally, if the likelihood of each instance of the FSP lock type is the same, a frequency-based attack on the FSM is preempted. For example, consider the FSM 100 in FIG. 1 where the total number of possible FSPs is 8!. One of the FSPs is correct, and 8!-1 FSPs are wrong. The SPeLL encryption scheme can choose any of these 8! FSPs. The complexity of the power analysis attack is therefore $n_s$!, which is intractable even for relatively small values of $n_s$. In other words, the same number of states are visited in all possible permutations thereby making power pattern analysis ineffective. The SPeLL state-permutation encryption scheme is described in more detail below with respect to the encrypt/decryption process.

Figure 2:
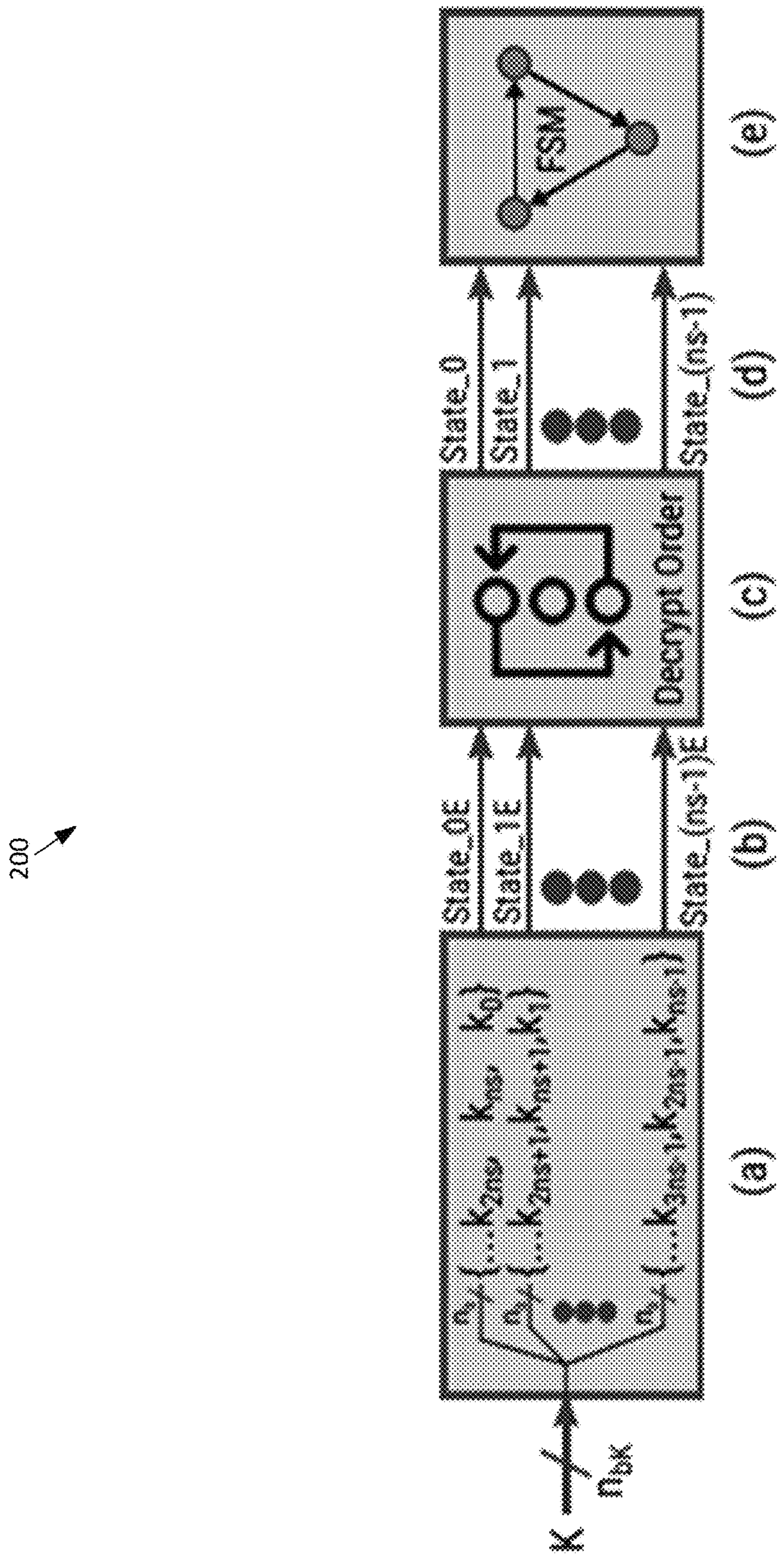
FIG. 2 is a diagram depicting the SPeLL end-to-end logic locking and unlocking process, according to embodiments of the disclosure.

The SPeLL end-to-end logic locking and unlocking process is illustrated by block diagram 200 in FIG. 2. The SPeLL encryption is divided into the following three steps.

Figure 3:
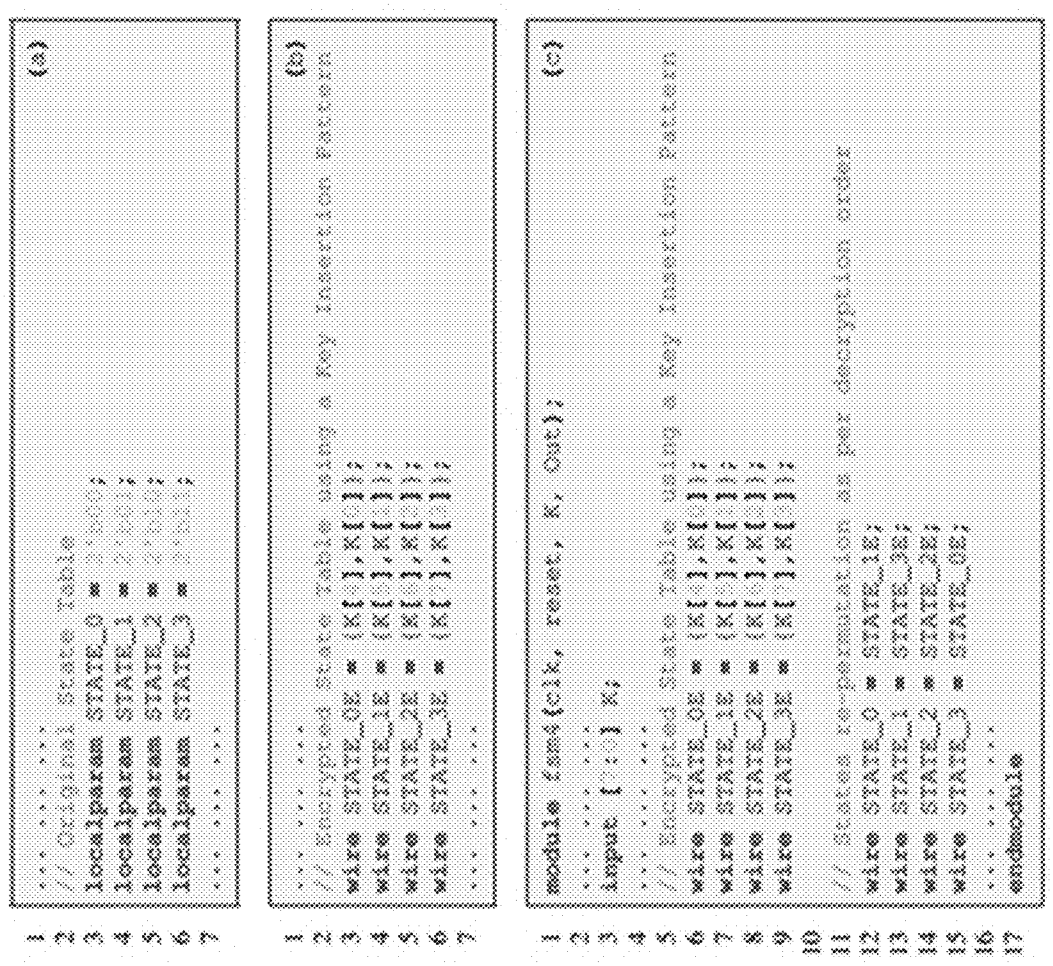
FIG. 3 is a diagram depicting the SPeLL state tables, according to embodiments of the disclosure.

1) Encrypted State Table: When described using a Hardware Description Language (HDL) (e.g., Verilog HDL, etc.), the FSM states are normally labeled using constant variables or local parameters. An example using Verilog HDL is shown in code example 300 of FIG. 3. FIG. 3 code block (a) is referred as the original state table. To encrypt the FSM transition maps, an encrypted state table is created by replacing the selected bits of the constant state parameters with their encrypted counterparts as shown in FIG. 2 encryption block (a). The input key is denoted K and is assumed to have $n_k$ bits. If $n_s$ is the number of states, there are $n_s$ encrypted local parameters each of length $n_b$ bits. A Verilog HDL example 300 for this encryption step is shown in FIG. 3 where code block (a) is the original state table, code block (b) is the encrypted state table and code block (c) is the decryption of the state table. The boolean matrix $K_p$ of size $n_s \times n_b$ having as its rows the $n_b$ encrypted bits of each state is referred to as the key insertion pattern. The generation of this matrix based on the input key K will be described next.

2) Key Insertion Pattern: When every bit in the state encodings is replaced with its encryption bit, then the boolean matrix $K_p$ is considered a Full Key Insertion Pattern (FKIP). This FKIP may be the ideal case for FSM logic locking. However, to reduce the SPeLL hardware overhead, one may encrypt a subset of the state encoding bits in a scenario. This subset encryption is referred to as Partial Key Insertion Pattern (PKIP). Examples ofFKIP and PKIP are given in table 400 of FIG. 4 where FKIP for states 0-7 are shown and PKIP for a subset of states 0-7 are shown according to different encryption techniques for the columns of the 3-bits for representing the states (e.g., Column 0 encryption, Column 1 encryption, Column 2 encryption, Zig-Zag column encryption and triangular column encryption). PKIP generates fewer FSPs as compared to FKIP.

3) State Bit Encryption: In an encryption step, the key is selected first, and the state bits are encrypted bit by bit. However, such an approach may not guarantee an FSP, i.e., an obfuscated FSM transition map in which all the states are visited. To guarantee FSP, SPeLL may first select a state permutation that is different from the identity. The key may then be extracted based on the encoding bits of the permuted states. Note that for FKIP, the length of the key is $n_k = n_s \times n_b$. The steps for key bit determination are as follows.

In a first step, given the number of states $n_s$ and the number of encoding bits $n_b$ per state ($n_b = \lceil \log_2(n_s) \rceil$), select a permutation among the ($n_s$!) FSPs. For example, FKIP in FIG. 4, $n_s = 8$ and $n_b = 3$. The number of FSPs is $n_s! = 8! = 40320$. The permutation is given by equation (1):

$$\sigma = \begin{pmatrix} 0 & 1 & 2 & 3 & 4 & 5 & 6 & 7 \\ 4 & 0 & 2 & 7 & 3 & 6 & 1 & 5 \end{pmatrix} \tag{1}$$

may generate the state table 500 shown in FIG. 5.

In a second step, flatten and concatenate the state table binary columns in equations (2-4):

$$K = \{Col_{n_b-1}, \ldots, Col_1, Col_0\} \tag{2}$$

Example: For the encrypted state table in Table *II*

$$K = 0b101010010011110011011000 \tag{3}$$

$$= 0x493CD8 \tag{4}$$

For a correct key input, the encrypted state labels (State_xE of FIG. 2 output states (b) and FIG. 3 code block (b)) are generated in an order that is identical to that of the permutation. For all other key inputs, the state order at the output results in a wrong FSM transition, either an FSP or an SSP.

The decryption in SPeLL includes applying the inverse permutation to the encrypted state table so that the correct state transition map is generated when the correct key is applied. The inverse permutation step is performed once during the design phase when the key is selected as a result of selecting the secret state permutation. The decryption step can be re-synthesized upon a change of the key. Since the secret state order is an FSP, its inverse is also an FSP, as illustrated in FIG. 2 decryption block (c), state output (d), and FSM block (e). As an example, the inverse permutation is given by equation (5):

$$\sigma^{-1} = \begin{pmatrix} 0 & 1 & 2 & 3 & 4 & 5 & 6 & 7 \\ 1 & 6 & 2 & 4 & 0 & 7 & 5 & 3 \end{pmatrix} \tag{5}$$

From a hardware viewpoint, the first row of the above array represents the pin numbers of the decryption module where the encrypted states are connected as inputs. The decryption module includes an interconnect fabric that associates each input with an output pin whose number is the code of an encrypted state. In reference to FIG. 6 block (a), the decrypting permutation is given by expression (6):

$$\begin{pmatrix} 0 & 1 & 2 & 3 \\ 3 & 0 & 2 & 1 \end{pmatrix} \tag{6}$$

while the order of states at the output of the decryption module is given by the permutation in expression (7):

$$\begin{pmatrix} 0 & 1 & 2 & 3 \\ 1 & 3 & 2 & 0 \end{pmatrix} \quad (7)$$

Figure 6:
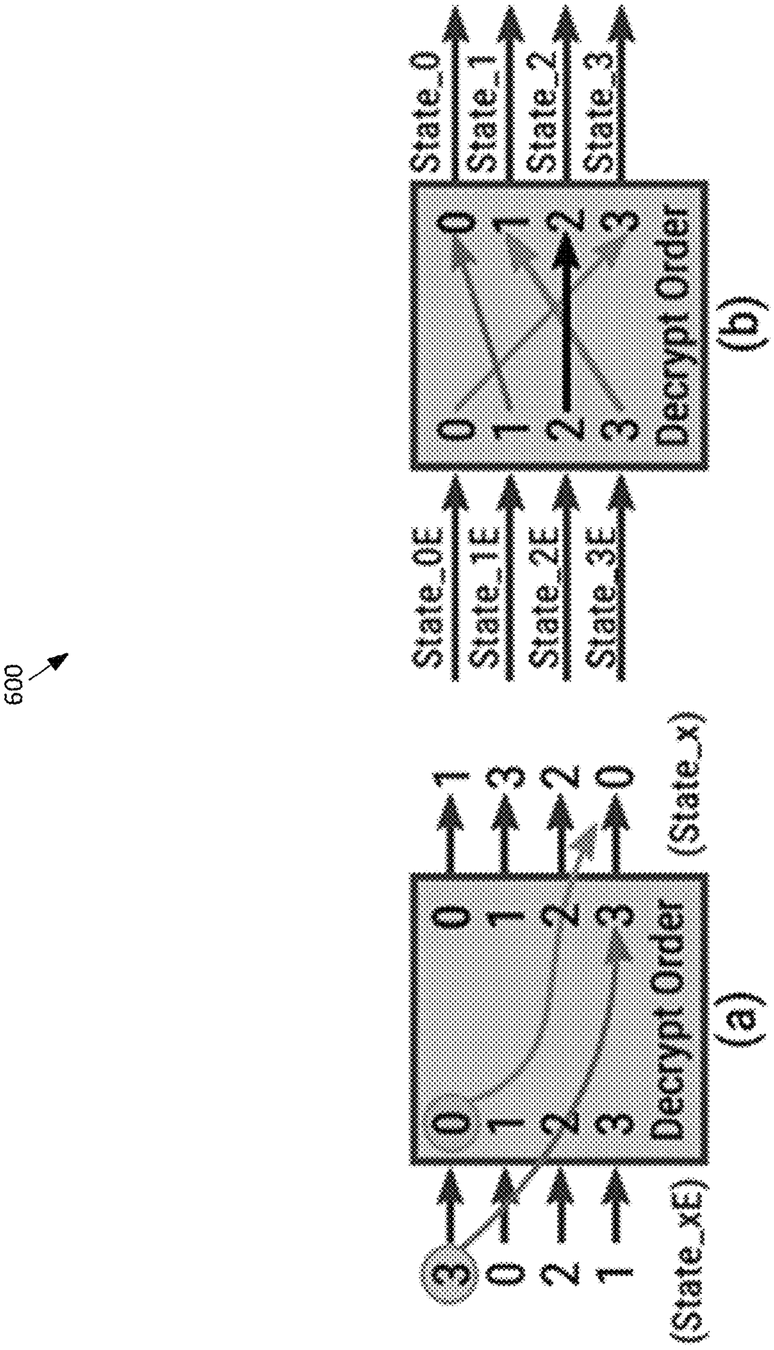
FIG. 6 is a diagram depicting the SPeLL decryption process, according to embodiments of the disclosure.

The second row of the above matrix is referred to as the Decrypt Order. The behavioral description of the SPeLL decryption in the Verilog HDL may be a block of assignments to wire elements. This is illustrated in FIG. 3 code block (c) where the decrypted State_γ signal is assigned the encrypted State_xE signal where y=δ(x) with δ being the decrypting permutation. This is also illustrated in block diagram 600 of FIG. 6 where the encrypting permutation of states is shown in FIG. 6 block (b). Note that the signals of the encrypted states are presented to the decrypted signals in the Decrypt Order.

In an example of counting encryptions, assume a subset of size $n_{vs}$ is visited by the FSM of a wrong key and that the states are encrypted according to the full key insertion pattern (FKIP). Then there are $(n_s-n_{vs})$ states whose encryption will not impact the behavior of the FSM. As a result, the number of unique encryptions may be given by expression (8):

$$\frac{n_s!}{(n_s-n_{us})!} \quad (8)$$

Note that the above count remains valid when no state is visited, $n_{vs}=0$, in which case, there is a trivial identity permutation. It also remains valid when all states are visited, $n_{vs}=n_s$, in which case there are $n_s!$ permutations, including the identity permutation which corresponds to the FSM in normal operation.

Figure 7:
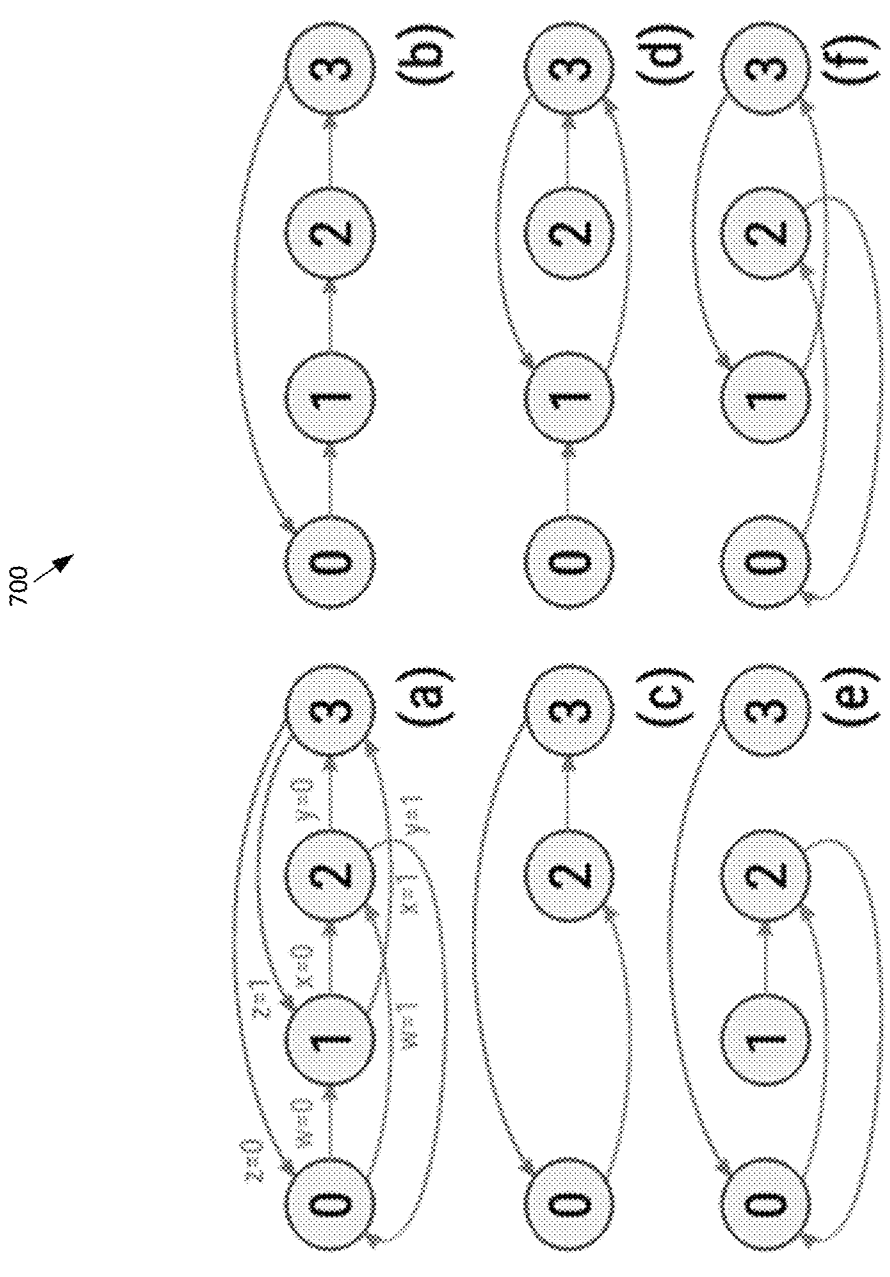
FIG. 7 is a diagram depicting types of FSMs, according to embodiments of the disclosure.

In an example of conditional next state transitions, it is noted that SPeLL was introduced for the case where the FSM behaves as a counter without any inputs. Consider now the example of a four-state FSM with four inputs in which each state transition is dependent on an input, as shown in diagram 700 of FIG. 7 and in particular FIG. 7 transition map (a). Accordingly, the FSM transition map may be either irreducible and include all the states, as in FIG. 7 transition map (b), or reducible to a proper subset of the states as in FIG. 7 transition maps (c), (d), (e) and (f). In both cases, a modified version of the original FSM is produced that can be treated as a counter FSM on its own with the SPeLL locking method applicable to it without any modification. The number of unique encryptions in each FSM remains as in expression (8). Once aspect that is accounted for is the change in the number of states $n_s$ for the FSM in the reducible case. Each reduced FSM has its own FSPs and SSPs and may have its own number of unique permutations as in expression (8). For example, the $n_s$ for the reduced FSM in FIG. 7 transition maps (b)-(f) is 4, 3, 2, 2, and 2, respectively.

The above observations have been verified through simulations for several encrypted FSMs of various sizes. Table 800 in FIG. 8 highlights some of the simulation results for the FSM of FIG. 7 transition map (a). For each set of inputs, the cases of 4-state, 3-state, and 2-state FSM are considered. Each case is characterized by a triplet of numbers (ψ, γ, ∫), where ψ is the total number of FSM in which $n_{vs}$ states are visited, γ is the number of unique encryptions as given in expression (8), and ∫ is the number of occurrences of each encryption. Note that ψ=∫γ. Note also that γ is the same for a given number $n_{vs}$. For instance, when $$n_{vs}=3,\ \gamma=\frac{4!}{1!}=24,$$

and when $$n_{vs}=2,\ \gamma=\frac{4!}{1!}=12.$$

Furthermore, γ is not impacted by FSM reducibility. On the other hand, FSM reducibility changes the total number of subset FSM's,psi. The smaller the reduced FSM, the larger is ψ. Also, note that for a given input configuration, the number of occurrences ∫ is the same, and so frequency-based analysis cannot be used for attacking SPeLL logic locking.

SPeLL has been implemented using an in-house tool chain based on open-source software, (e.g., Yosys for logic synthesis, Icarus for Verilog Simulation, GTKWave for waveform viewing, Netlistsvg for Verilog netlist drawing, and Digital for digital logic design). The tool chain referred to as OSHDA (Opensource Secure Hardware Design and Analysis) is built using Python and features a Graphical User Interface based on the Python library of Qt. It also features a scripting subsystem that enables the addition of custom scripts in any language for specialized design or analysis tasks. OSHDA can be used at various levels to enable logic design in Verilog, logic simulation, logic testing, gate-level translation, logic synthesis, analysis and optimization for application specific integrated circuit (ASIC) and FPGAs.

One challenge encountered in the evaluation of SPeLL is the absence of a behavioral suite of benchmark sequential circuits. The ISCAS89 benchmark have been commonly used in the prior art on FSM obfuscation. However, these circuits are all gate-level netlists and are therefore not appropriate for validating the RTL logic locking of SPeLL. One possible approach would have been to extract behavioral models from the ISCAS89 benchmarks. However, the number of flip-flops could be extracted from the gate-level netlist but not the number of states. On the other hand, the repository of benchmarks maintains not only the ISCAS89 suite but also the LGSynth91 benchmark. Each FSM in the LGSynth91 benchmarks is described using a Kiss2 file format. The Kiss2 file provides information on FSM inputs, next-state logic, and FSM outputs.

In one example, a use made of the OSHDA tool chain was to automate the translation of the LGSynth91 benchmarks from the Kiss2 format to the behavioral Verilog format. OSHDA has been extended with Python scripts that take a Kiss2 file as an input and generate several Verilog files, including synthesizable behavioral models of the original Kiss2 circuits, SPeLL-based secure Verilog designs, and test-benches for both the original and secured designs. These generated benchmark files have been used for verification, analysis, and synthesis. In addition, simulations at various levels of the design flow have been performed to verify the functionality and assess the overhead of the secure SPeLL designs.

Furthermore, helper Python scripts have been written to collect statistics on the SPeLL methodology and on the secure FSM designs it generates. The statistics include counts on the number of abnormal FSM's that result from using the wrong keys along with the number of unique permutations as described above. OSHDA was also used for the logic synthesis of the SPeLL-based secure FSM and for estimating the overhead of logic locking as well as the hard-ware resources consumed by the various benchmark circuits. The secure FSM's have been synthesized for Xilinx 7 series of FPGAs.

In the FSM obfuscation methods of the prior art, the FSM enters into an absorbing chain of obfuscation states when the wrong key is applied. These states are added to the original FSM design. A power-based side-channel attack can prune away wrong keys by analyzing the power consumption patterns of the obfuscation modes. On the other hand, SPeLL does not augment the FSM states, but wrong transitions on the original FSM graph are triggered when the wrong key is used. If an FSP is used, all states are involved in the wrong transitions, and the logically locked FSM has a power pattern that is indistinguishable from that of the unlocked FSM. Since the number of FSP's is factorial in the number of states, a power-based side-channel attack on SPeLL is not feasible.

FSM's are prone to register overwrite attacks where an attacker tampers with the contents of the state registers to bypass the obfuscation states and resume normal state transitions. Once in a normal mode, protection is unavailable. One possible solution to register overwrite attacks is where any of the normal states can be deflected to one of several black-hole clusters, each made of obfuscation states. One disadvantage of the deflection approach is that once captured within a black-hole cluster, the FSM never returns to normal-mode operation, which again makes it vulnerable to side-channel attacks. In SPeLL, register tampering is ineffective because even if an attacker is somehow successful at correctly overwriting the registers for a given transition, this success is not propagated to the following transitions. This is because SPeLL protection remains active throughout FSM operation.

As mentioned above, the prior art implements FSM obfuscation at the gate level and makes use of ISCA89 benchmark circuits to validate and assess the security mechanisms. On the other hand, SPeLL inserts the FSM security mechanisms at the behavioral level, and while the ISCA89 circuits provide information on the number of D Flip-Flops, they cannot be used to validate and assess SPeLL since the number of states in each circuit is missing.

Figure 10:
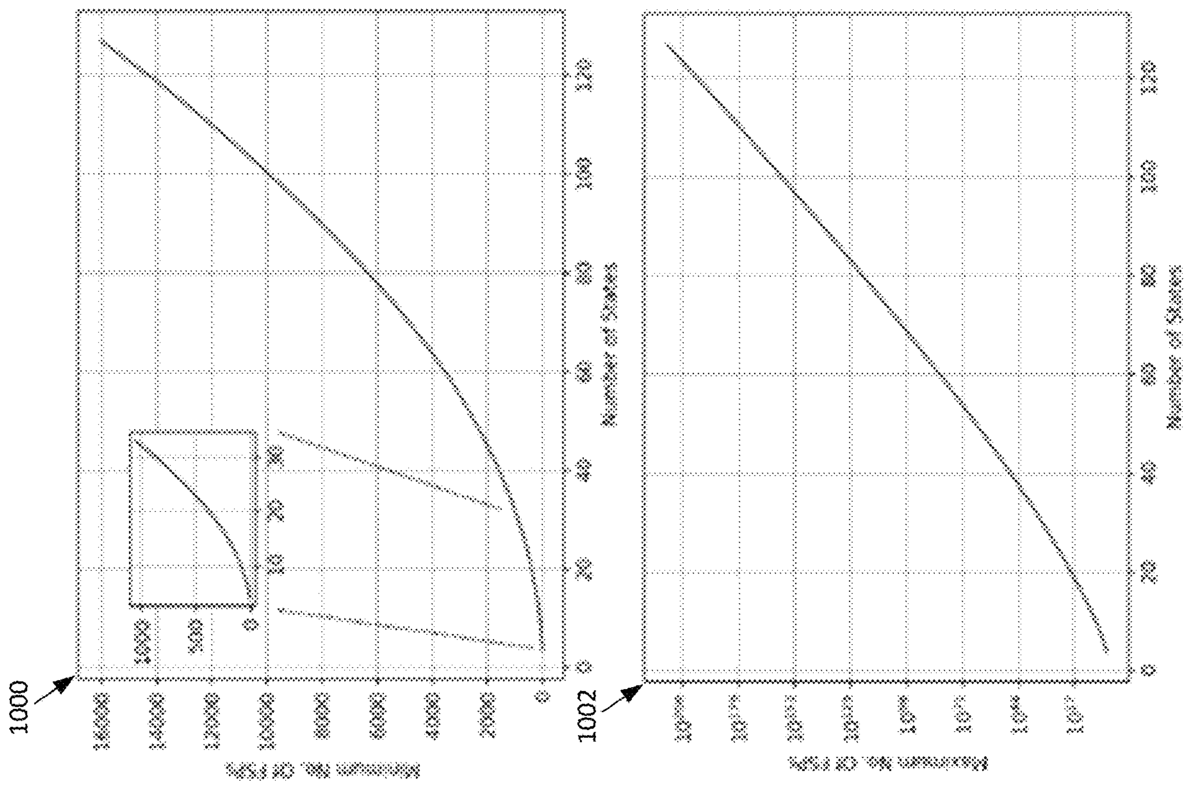
FIG. 10 is a diagram depicting a number of unique FSPs/Resister patterns, according to embodiments of the disclosure.

Table 900 in FIG. 9 provides a feature-based comparison between SPeLL and the state-of-the-art techniques including [12] Obfuscation-Based SOC Design, [13] Interlocking Obfuscation for Anti-Tamper Hardware, [14] Dynamic State-Deflection Method for Gat-Level Design Obfuscation and [15] Active Hardware Metering for Intellectual Property Protection and Security. Additionally, graphs 1000 and 1002 in FIG. 10 illustrate the combinatorial increase in the SPeLL FSPs as the number of states increases. The minimum number of FSP's shows significant increase (e.g., see enlarged portion of graph 1000 in FIG. 10) with the number of states when compared with the unique number of register patterns, under the assumption that all the D Flip-Flops in the netlist are state registers. The minimum FSPs are generated when a particular input is applied for which the number of states in the FSM transition graph is minimized. Finding such inputs may help the attacker in reducing the number of FSPs to analyze. However, when the number of minimum FSP's is large, the attacker still faces a significant challenge in overcoming SPeLL logic locking.

The security hardware overhead and the extent to which it can be optimized depend on the number of inputs, the tally of conditional next-state transitions, and the inter-twining of these. These parameters vary from one design to another, and so do security overhead and resource optimization. This is because inserting key signals within the state parameters makes the state table dynamic and limits the opportunities for hardware optimization. As highlighted above, formal synthesis using state-of-the-art tools may not generate highly optimized hardware and may therefore need user's intervention. However, to highlight the trade-off between the security hardware overhead and FSP complexity, table 1100 in FIG. 11 is shown where counter FSM's are selected to make sure the designs themselves use minimal hardware resources. The counters do not have any inputs or any conditional next-state transitions. The generated hardware includes MUXes and sequential next-state logic. FKIP results in the maximum number of unique FSPs but at the expense of increased hardware resources. Moving from FKIP to PKIP, FSP complexity decreases, and so does the SPeLL hardware overhead. A similar trend is shown in table 1200 in FIG. 12, where several LGSynth91 benchmark circuits are synthesized to highlight the overhead of added security. Note that by using PKIP for smaller FSMs, the method achieves more reduction in the FSPs than reducing hardware resources. Therefore, FKIP is beneficial for designs containing smaller FSMs so as not to compromise on the strength of logic locking. For FSMs with eight or more states, the PKIP may be more suitable to reduce hardware resources while keeping the number of FSP's at an acceptable level. If the FKIP and PKIP hardware overheads are comparable, using FKIP is beneficial. Furthermore, using PKIP is just one approach to reduce SPeLL hardware overhead.

The presented behavioral level FSM-locking scheme, SPeLL, replaces the encoding bits in the state table with the key input lines according to a selected key-insertion pattern. The state table, thus encrypted, enables the run-time assignment of labels to each state, making the FSM transition map key-dependent. As a result, for a given FSM or sub-FSM, a large number of unique full-state permutations (FSPs) are generated as the method sweeps through all the possible keys. The existence and number of these FSPs prevent power-based side-channel attacks as they are all equally likely and have similar power signatures. Exposure to reverse engineering attacks is also reduced due to the gate-level amalgamation of the security block HDL with the behavioral HDL of the FSM. Register overwrite attacks are made inactive by the fact that the FSM obfuscation modes use the same registers as the normal modes with protection provided throughout FSM operation. The key-dependent state table limits the opportunities for hardware optimization using logic synthesis and may therefore result in hardware overhead. However, this can be addressed using a partial key-insertion pattern (PKIP), which enables the implementation of a trade-off between logic locking strength and hardware overhead.

It is noted that the methods described through this description and shown in the figures may be executed by specific hardware devices (e.g., ASIC, FPGA, etc.) embedded into a larger system that is designed for a particular practical application that utilizes sequential circuits for achieving a desired result (e.g., control systems, wired/wireless communication systems, etc.). Alternatively, or in conjunction with the hardware, the methods described through this description and shown in the figures may be executed by one or more computers (e.g., personal computers (PC), servers, etc.) locally or on the cloud. The computers may include a processor, memory, user interfaces and communication interfaces (wired and/or wireless).

Figure 13:
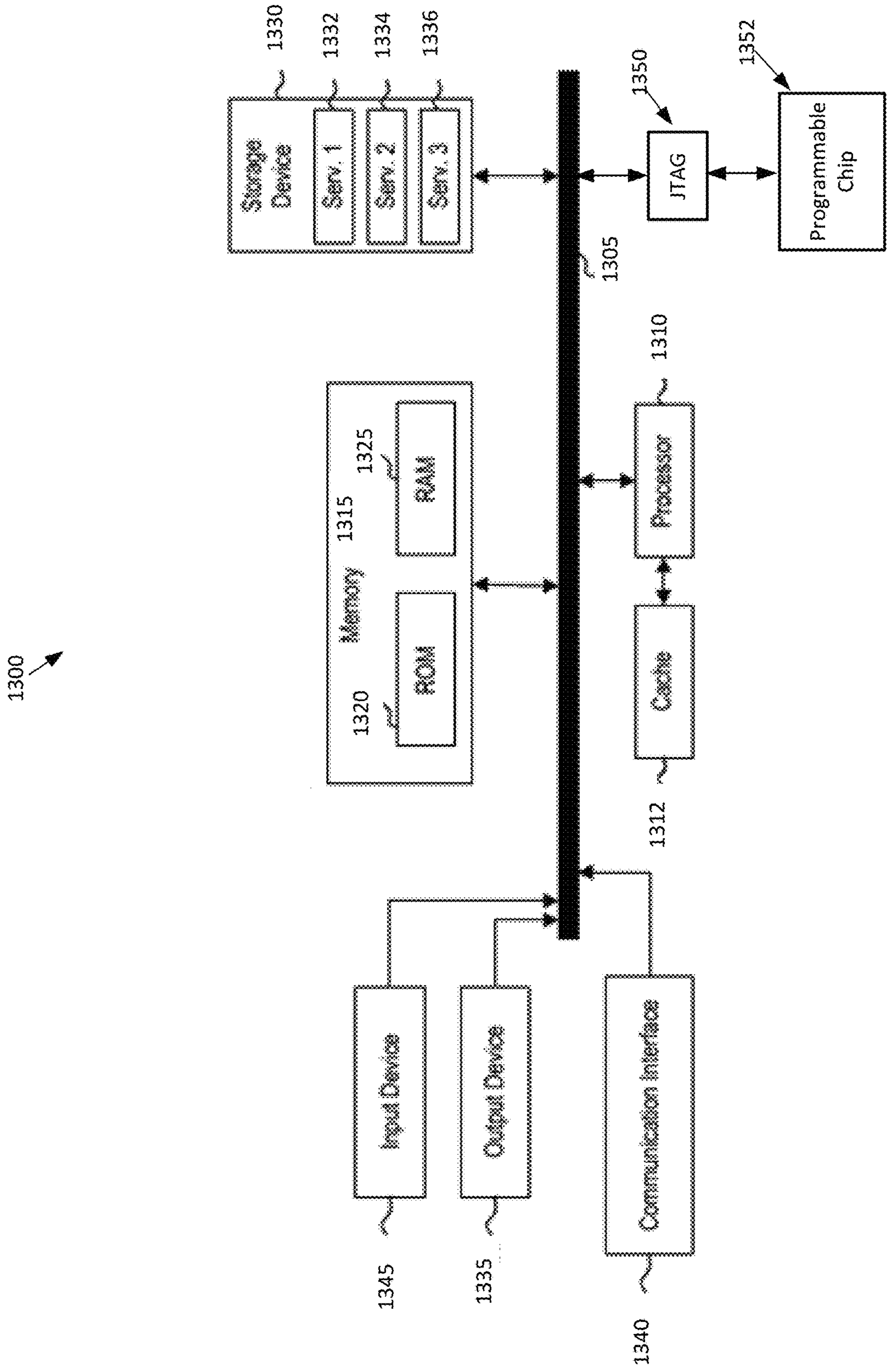
FIG. 13 is block diagram showing hardware for designing and securing sequential circuits based on the SPeLL solution, according to embodiments of the disclosure.

FIG. 13 illustrates an example system bus architecture of computing system 1300, according to example embodiments. System 1300 may be representative of a computing system for designing and/or programming SPeLL secured sequential circuits (e.g., sequential circuits of an FSM) residing on chips such as ASICs and FPGAs. One or more components of system 1300 may be in electrical communication with each other using a bus 1305. System 1300 may include a processing unit (CPU or processor) 1310 and a system bus 1305 that couples various system components including the system memory 1315, such as read only memory (ROM) 1320 and random-access memory (RAM) 1325, to processor 1310. System 1300 may include a cache of high-speed memory connected directly with, in close proximity to, or integrated as part of processor 1310. System 1300 may copy data from memory 1315 and/or storage device 1330 to cache 1312 for quick access by processor 1310. In this way, cache 1312 may provide a performance boost that avoids processor 1310 delays while waiting for data. These and other modules may control or be configured to control processor 1310 to perform various actions. Other system memory 1315 may be available for use as well. Memory 1315 may include multiple different types of memory with different performance characteristics. Processor 1310 may include any general-purpose processor and a hardware module or software module, such as service 1 1332, service 2 1334, and service 3 1336 stored in storage device 1330, configured to control processor 1310 as well as a special-purpose processor where software instructions are incorporated into the actual processor design. Processor 1310 may essentially be a completely self-contained computing system, containing multiple cores or processors, a bus, memory controller, cache, etc. A multi-core processor may be symmetric or asymmetric.

To enable user interaction with the computing system 1300, an input device 1345 may represent any number of input mechanisms, such as a microphone for speech, a touch-sensitive screen for gesture or graphical input, keyboard, mouse, motion input, speech and so forth. An output device 1335 may also be one or more of a number of output mechanisms known to those of skill in the art. In some instances, multimodal systems may enable a user to provide multiple types of input to communicate with computing system 1300. Communications interface 1340 may generally govern and manage the user input and system output. There is no restriction on operating on any particular hardware arrangement and therefore the basic features here may easily be substituted for improved hardware or firmware arrangements as they are developed. Storage device 1330 may be a non-volatile memory and may be a hard disk or other types of non-transitory computer readable media which may store data that are accessible by a computer, such as magnetic cassettes, flash memory cards, solid state memory devices, digital versatile disks, cartridges, random access memories (RAMs) 1325, read only memory (ROM) 1320, and hybrids thereof. Storage device 1330 may include services 1332, 1334, and 1336 for controlling the processor 1310. Other hardware or software modules are contemplated. Storage device 1330 may be connected to system bus 1305. In one aspect, a hardware module that performs a particular function may include the software component stored in a computer-readable medium in connection with the necessary hardware components, such as processor 1310, bus 1305, output device 1335, and so forth, to carry out the function.

Computer system 1300 may be used to design specific functionality (e.g., a sequential circuit) secured by SPeLL. In one example, a programmer (e.g., using Verilog HDL) may program the sequential circuit and program the encryption/decryption state functions associated with SPeLL to encrypt/decrypt the state transition table associated with the sequential circuit (e.g., see FIG. 3). The programmer may then electrically couple a programmable chip (e.g., FPGA) 1352 to system 1300 via a dedicated connection such as joint test action group (JTAG) interface 1350. Once programmed, the FPGA may be deployed in the field. In another example, a circuit designer may design the sequential circuit with encryption/decryption state functions associated with SPeLL to encrypt/decrypt the state transition table associated with the sequential circuit. The circuit designer may produce ASICs based on the design. These ASICs may then be deployed in the field.

Figure 14:
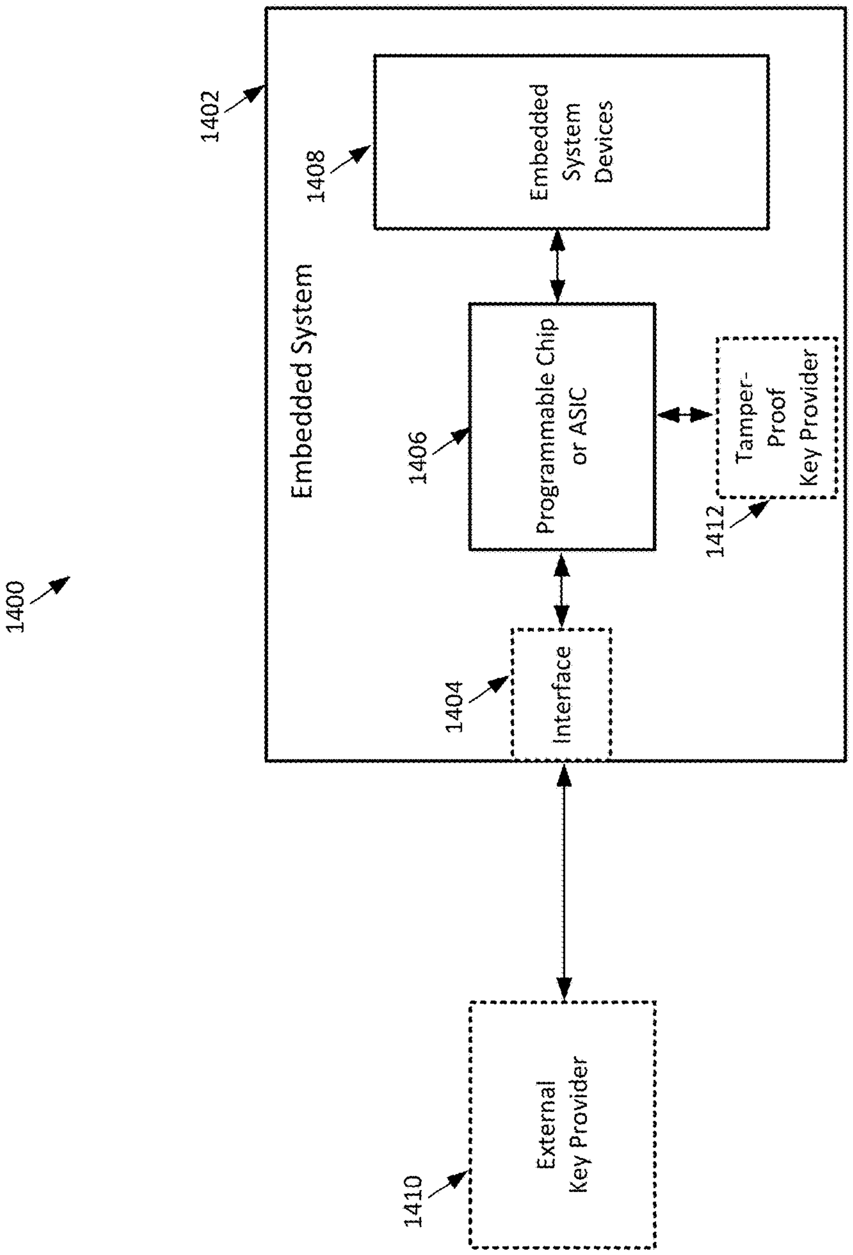
FIG. 14 is block diagram showing an embedded system application for sequential circuits secured based on the Spell solution, according to embodiments of the disclosure.

Field deployment may include integrating the sequential circuit residing on the FPGA and/or ASIC into a larger system 1400 as shown in FIG. 14. System 1400 may include an embedded system 1402 communicating with an optional external provider. As shown in FIG. 14, embedded system 1402 may include the programmable chip or ASIC 1406, embedded system devices 1408, optional interface 1404 for communicating with an optional external key provider 1410 and an optional tamper proof internal key provider 1412. In one example, tamper proof key provider 1412 may provide the cryptographic key to programmable chip or ASIC 1406. In another example, external key provider 1410 may provide the cryptographic key to programmable chip or ASIC 1406 via external device interface 1404. Regardless of the mechanism, programmable chip or ASIC 1406 retrieves or receives the cryptographic key at runtime and uses it to properly decrypt (i.e., unscramble) the state transition table thereby ensuring that the sequential circuit operates as designed. Since the attacker will not have access this cryptographic key, the attacker will attempt to predict the cryptographic key. This process will be difficult given the large number of permutations in the SPeLL solution.

Figure 15:
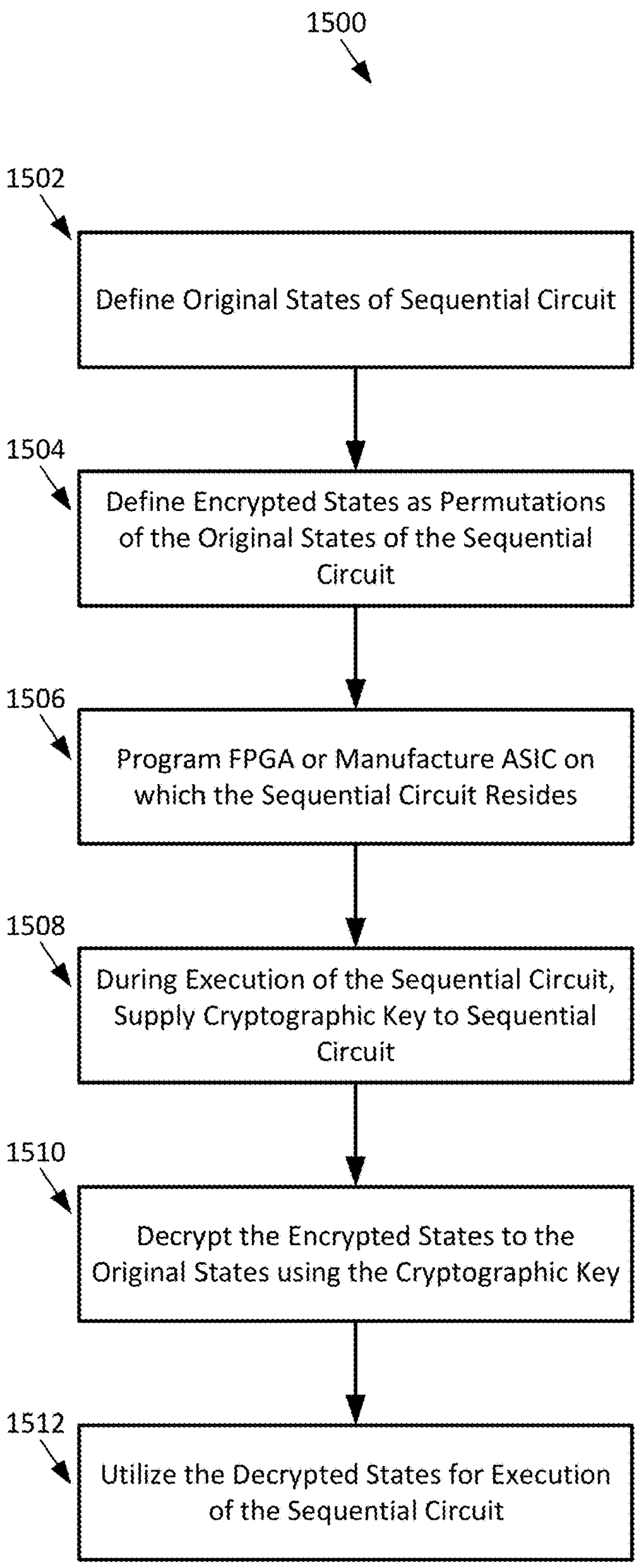
FIG. 15 is a flowchart showing the overall operation of designing and deploying a sequential circuit protected by the SPeLL solution, according to embodiments of the disclosure.

FIG. 15 is a flowchart 1500 showing the overall operation designing and deploying a sequential circuit protected by the SPeLL solution. This solution is applicable to hardware circuits residing on ASICs and programmable circuits such as an FPGA on which a sequential circuit resides. In steps 1502 and 1504, the programmer or ASIC designer defines the original states and encrypted states of the sequential circuit respectively. In step 1506, the programmer or ASIC designer programs the programmable device or programs the logic for manufacturing the ASIC to include the designed sequential circuit. The programming may include the steps of describing the design and state permutations using high-level hardware description language (e.g., Verliog HDL), synthesizing the design to generate a gate-level netlist, using place-and-route tools to determine how to make the gate-level netlist to the hardware (e.g., FPGA, ASIC, etc.), and loading the system to programmable hardware or manufacturing hardware based on the design. The programmable device or ASIC may then be deployed in the field. Deployment may include integrating the programmable device or ASIC into a larger system such as an embedded system (e.g., system controller, etc.). During execution, in step 1508, a reception circuit of the sequential circuit receives or retrieves the cryptographic key from an external device which may be a device internal to the embedded system or a device in communication with the embedded system. An encryption circuit of the sequential circuit encrypts the states and then a decryption circuit of the sequential circuit uses the cryptographic key in step 1510 to decrypt the encrypted states back to the original states. The sequential circuit, in step 1512, then uses the decrypted states during execution of the sequential circuit.

While the foregoing is directed to embodiments described herein, other and further embodiments may be devised without departing from the basic scope thereof. For example, the solution described above with respect to implementation in an FPGA and ASIC may also be implemented in other hardware devices such as a programmable logic controller (PLC) or any hardware device that utilizes states to implement a sequential circuit. In addition, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure.

It is therefore intended that the following appended claims include all such modifications, permutations, and equivalents as fall within the true spirit and scope of these teachings.

What is claimed is:

1. A method of state permutation logic locking (SPeLL) for sequential circuits, the method comprising:

encrypting original states of a finite state machine (FSM) to produce encrypted states, by modifying state bit encodings within the FSM based on a cryptographic key to transition an initial order of the original states into a key-dependent secret permutation of the encrypted states, wherein the secret permutation is different than the initial order and maintains a number of the original states and a number of state transitions of the FSM corresponding to the original states;

determining the cryptographic key that corresponds to the transition from the initial order of the original states to the secret permutation of the encrypted states; and decrypting the encrypted states at runtime, by using the cryptographic key by modifying the state bit encodings to transition from the secret permutation of the encrypted states back to the initial order of the original states.

2. The method of claim 1, comprising:

defining the encrypting of the original states of the sequential circuit at a Register-Transfer Level (RTL).

3. The method of claim 1, comprising:

encrypting the original states of the sequential circuit to produce the secret permutation of the encrypted states having a number of encrypted states equal to a number of the original states.

4. The method of claim 1, comprising:

encrypting all of the original states to produce the encrypted states.

5. The method of claim 1, comprising:

encrypting a subset of the original states to produce the encrypted states.

6. The method of claim 1, comprising:

encrypting the original states of the sequential circuit by encrypting selected bits representing the original states.

7. The method of claim 1, comprising:

determining the cryptographic key by receiving the cryptographic key from an external device external to the sequential circuit.

8. The method of claim 7, wherein the external device is a tamper-proof key provider residing in an embedded system with the sequential circuit.

9. The method of claim 7, wherein the external device is communicatively coupled to an embedded system in which the sequential circuit resides.

10. The method of claim 1, wherein the sequential circuit resides on an application specific integrated circuit (ASIC), a field programmable gate array (FPGA), or a programmable logic controller (PLC).

11. A sequential circuit protected by state permutation logic locking (SPeLL), the sequential circuit comprising:

an encryption circuit configured to encrypt original states of a finite state machine (FSM) to produce encrypted states, by modifying state bit encodings within the FSM based on a cryptographic key to transition an initial order of the original states into a key-dependent secret permutation of the encrypted states, wherein the secret permutation is different than the initial order and maintains a number of the original states and a number of state transitions of the FSM corresponding to the original states;

a reception circuit configured to receive the cryptographic key that corresponds to the transition from the initial order of the original states to the secret permutation of the encrypted states; and a decryption circuit configured to decrypt the encrypted states at runtime by using the cryptographic key by modifying the state bit encodings to transition from the secret permutation of the encrypted states back to the initial order of the original states.

12. The sequential circuit of claim 11, wherein the encryption circuit is configured to define the encrypting of the original states of the sequential circuit at a Register-Transfer Level (RTL).

13. The sequential circuit of claim 11, wherein the encryption circuit is configured to encrypt the original states of the sequential circuit to produce the secret permutation of the encrypted states having a number of encrypted states equal to a number of the original states.

14. The sequential circuit of claim 11, wherein the encryption circuit is configured to encrypt all of the original states to produce the encrypted states.

15. The sequential circuit of claim 11, wherein the encryption circuit is configured to encrypt a subset of the original states to produce the encrypted states.

16. The sequential circuit of claim 11, wherein the encryption circuit is configured to encrypt the original states of the sequential circuit by encrypting selected bits representing the original states.

17. The sequential circuit of claim 11, wherein the decryption circuit is configured to determine the cryptographic key by receiving the cryptographic key from an external device external to the sequential circuit.

18. The sequential circuit of claim 17, wherein the external device is a tamper-proof key provider residing in an embedded system with the sequential circuit.

19. The sequential circuit of claim 17, wherein the external device is communicatively coupled to an embedded system in which the sequential circuit resides.

20. The sequential circuit of claim 11, wherein the sequential circuit resides on an application specific integrated circuit (ASIC), a field programmable gate array (FPGA), or a programmable logic controller (PLC).

* * * * *